United States Patent [19]
Hedges

[11] Patent Number: 5,105,577
[45] Date of Patent: Apr. 21, 1992

[54] ARTIFICIAL MULCH CHIPS

[76] Inventor: Gary W. Hedges, 2389 Green Rd., Madison, Ohio 44057

[21] Appl. No.: 688,095

[22] Filed: Apr. 19, 1991

[51] Int. Cl.$^5$ .............................................. A01G 7/00
[52] U.S. Cl. ................................................... 47/9
[58] Field of Search .............................. 47/9, 9 S, 9 C

[56] References Cited

U.S. PATENT DOCUMENTS

| | | | |
|---|---|---|---|
| 3,775,147 | 11/1973 | Ferm | 47/9 |
| 3,876,411 | 4/1975 | Fowler | 47/9 |
| 3,901,838 | 8/1975 | Clendinning et al. | 47/9 |
| 4,062,145 | 12/1977 | Gidge | 47/9 S |
| 4,243,703 | 1/1981 | Palvarini et al. | 47/9 S |
| 4,282,682 | 8/1981 | Dalens et al. | 47/9 |
| 4,910,052 | 3/1990 | Caldwell | 47/9 S |
| 4,932,156 | 6/1990 | Underwood | 47/9 |

FOREIGN PATENT DOCUMENTS

| | | | |
|---|---|---|---|
| 3337592 | 4/1985 | Fed. Rep. of Germany | 47/9 |
| 57-26525 | 2/1982 | Japan | 47/9 |

*Primary Examiner*—David A. Scherbel
*Assistant Examiner*—Joanne C. Downs
*Attorney, Agent, or Firm*—D. Peter Hockberg; Mark Kusner; Louis J. Weisz

[57] ABSTRACT

Chip-like mulching material having a specific gravity greater than 1 is formed from various plastics. The surface of the chips is embossed with a design providing additional surface area, thereby facilitating the diffusion to the surrounding environment of fugitive active ingredients when the same are contained therein including, for example, animal repellents, insecticides, or odorants. In a preferred embodiment, the chips are made from thermoplastic material, embossed and colored to simulate bark chips from a tree.

7 Claims, 1 Drawing Sheet

ARTIFICIAL MULCH CHIPS

TECHNICAL FIELD

This invention relates to mulching material suitable for use as ground cover and for decorative purposes. More particularly, this invention relates to relatively small, plastic, chip-like objects, especially to those provided with embossed designs thereon, intended for disposition upon ground surfaces. Specifically, this invention relates to relatively flat, chip-like objects made from thermoplastic polymers which are useful for mulching indoor and outdoor plants, and for providing cover over exposed areas.

BACKGROUND OF THE INVENTION

Since the beginning of agriculture, the cultivation of desirable plants has been hampered by the associated growth of weed plants which tend to sprout in close proximity to cultivated plants, and which compete with the latter for space and nutrients. In addition, any exposed ground adjacent to the plants causes the unwanted loss of water from the soil, depriving the plants of needed moisture. In response to these problems, one of the methods commonly resorted to in order to discourage the growth of weeds and to retain soil moisture involves the distribution around the plants of loose covering material of a type capable of preventing light from reaching the plant soil and stimulating germination of dormant weed seeds, and which can insulate the soil from contact with drying breezes.

A variety of such materials or "mulches" have in the past been used for the purpose, including leaves, straw, peat moss and the like. Generally speaking, these materials function well in blocking light and in preventing the escape of ground moisture; however, they have the distinct disadvantage of being relatively quick to compact and decompose, at which point they become substantially ineffective with respect to their intended purpose.

Recognizing these disadvantages, other methods for mulching plants have been proposed. Among these may be mentioned, for example, the use of sheets of opaque plastic film which are perforated at intervals so that plantlets can be inserted therethrough and rooted in the soil beneath. While mulch films of the type described are widely used in commercial farming operations where they particularly lend themselves to mulching row crops, they have an unavoidable artificial look, and therefore, are unsightly, particularly in instances where a more natural appearance of the landscape is desired.

In recent years, the forest industry has provided alternative mulches in the form of tree bark materials obtained as byproducts from lumbering operations. One variety of these materials takes the form of bark chips that can be spread where needed to provide an attractive ground cover, and which serve as a weed inhibitor and a moisture conservator. However, wood chips have the disadvantage that they also degrade with the passage of time, losing their attractiveness and becoming a refuge for noxious pests including termites, carpenter ants, and other harmful insects.

BRIEF DESCRIPTION OF THE INVENTION

In light of the foregoing, therefore, it is a first aspect of this invention to provide artificial, chip-like mulches.

It is a second aspect of this invention to provide chip-like mulches which are more permanent than those formed from naturally occurring cellulosic materials.

Another aspect of this invention is to provide chip-like mulches that can be manufactured with an attractive surface texturing, that can serve a utilitarian purpose as well.

An additional aspect of this invention is to provide chip-like mulches that can be formed to include fugitive active agents which impart pleasing scents to the mulches, and which can act as repellents to unwanted animal life.

One aspect of this invention is to provide chip-like mulches that discourage the presence of undesirable insect life.

A further aspect of this invention is to provide a useful product from refuse plastic, which would otherwise be a burden on communal waste disposal systems.

Yet another aspect of this invention is to provide chip-like mulches which resist being displaced by runoff water and which possess pleasing colors.

A still further object of this invention is to provide chip-like mulches suitable for indoor or outdoor use.

The preceding and additional aspects of the invention are provided by a mulch chip prepared from a composition comprising synthetic polymeric plastic, the composition having a specific gravity greater than 1, and the exterior surface of the chip having a design embossed thereon.

The preceding and further aspects of the invention are provided by a mulch chip prepared from a composition comprising at least one thermoplastic polymer, the composition having a specific gravity greater than 1, and the exterior surface of the chip being configured to simulate the bark of a tree.

BRIEF DESCRIPTION OF THE DRAWINGS

The invention will be better understood when reference is had to the following drawings in which.

DETAILED DESCRIPTION OF THE INVENTION

Figure 1:
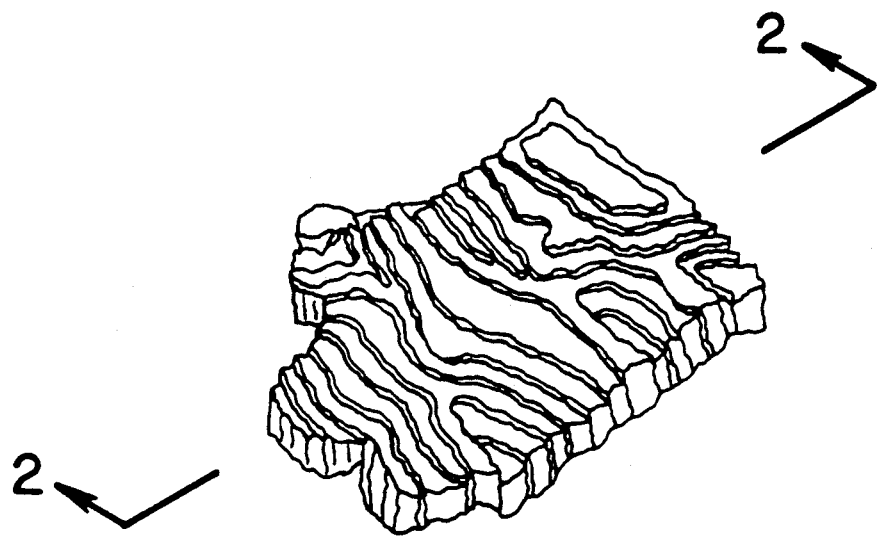
FIG. 1 is an isometric view of a mulch chip of the invention, embossed to simulate a chip from the bark of a tree.

As described hereinafter, applicant's invention involves the fabrication of chip-like mulches from plastic material, particularly from thermoplastic material. Advantageously, the chips can be made from plastics unsuitable for more demanding service, for example, the chips can be made from off-grade and reject plastic materials, plastic floor sweepings, and the like. In addition to conserving moisture and retarding weed growth, the chips serve to absorb and retain heat, and may be compounded to protect an area and/or plants from unwanted animals and insect life as hereinafter described. A further advantage of the chips is that unlike natural mulches, they require no maintenance, last indefinitely, and are suitable for indoor or outdoor use.

Inasmuch as the chips are frequently used in areas subjected to contact with water, it is important that they possess a specific gravity greater than 1 to prevent them from floating and thus being displaced by runoff water. Where the plastic material employed does not inherently possess a specific gravity greater than 1, it will be compounded by being combined with materials which do have such a specific gravity so that the specific gravity of the resulting compound will likewise be greater than 1.

Compounding ingredients useful for adjusting the specific gravity, or as fillers include, for example, sand, crushed quartz, clay, chalk, limestone, alumina, magnesia, metal powders or metal oxides, barite, mica, talc, and other material.

In those instances where it is desired to impart a particular color to the plastic chips, any of a variety of colorants may be incorporated therein including both organic and inorganic pigments. Among such colorants may be mentioned barium sulfate, phthalocyanine compounds, chromium compounds, quinacridone, molybates, iron compounds, and numerous others. The colorants selected will desirably have a decomposition temperature sufficiently high to withstand the molding temperatures to which the plastics are subjected during fabrication of the chips.

In addition, when colorants are employed, it is sometimes desirable to add other compounding materials to the chips including UV absorbers such as, for example, hydroxybenzophenones to improve the light stability of the plastics and their colorants. Stabilizers, for instance, carbon black, may also be employed to prevent photochemical degradation.

Other useful compounding agents include antioxidants such as phenols, aromatic amines, salts and condensation products of amines and aminophenols with aldehydes, ketones, thio compounds, and others.

Plasticizers may also be compounded in the chips including such materials as epoxies, glycols, adipates, phthalates, phosphates, and equivalent plasticizer materials.

An important aspect of the invention is that the mulch chips allow the incorporation of active materials capable of exerting a desirable effect on their surroundings. In this regard, insecticides are included in the chips to discourage or eliminate insects that might otherwise seek shelter thereabout. Such materials may desirably be incorporated into the plastic of the chip during the process of its fabrication, being gradually released from the chip over a prolonged period of time. Alternatively, the insecticide may be incorporated as a coating on the chip following its manufacture, again providing release over an extended period of time. The coating method will normally be resorted to in those instances where the insecticide has a tendency to decompose at the temperature at which the chip is formed.

The insecticides may include such materials as, for example, inorganic arsenicals, chlorinated hydrocarbons, pyrethrum, organic phosphates, carbamates, and other materials.

In like fashion, the mulch chips of the invention may be used to deter animals, for instance, deer and rabbits, from visiting the area where the chips are located and from damaging plants situated thereabout. Useful repellents include such substances as copper naphthenate, lime/sulphur mixtures, and the like. When employed, the repellents will be incorporated into the chips using methods similar to those described in connection with the incorporation of insecticides.

According to another aspect of the present invention, mulch chips as described above are formed to include odorant materials, for example, a pine scent, lemon scent, cinnamon, or other fragrances of the kind that tend to make an area more pleasant. Again, the same procedures described in connection with the incorporation of insecticides will be used to incorporate odorants into the chips.

Importantly, it has been found that embossing of the wood chips provides a way in which to increase the surface area of the chips and thereby to enhance their activity where active substances such as insecticides, repellents, or odorants have been combined therewith. Such enhances activity results from the fact that the embossing provides a greater surface area from which the active materials may be disseminated into their adjacent surroundings.

A further advantage of embossing the chips of the invention lies in the fact that they can thereby be provided with decorative designs, or be made to simulate the appearance of naturally occurring chips, for example, bark chips from trees. In this regard, a particularly preferred embodiment of the invention involves the preparation of thermoplastic mulch chips having embossing simulating that of natural tree bark chips, and advantageously including colorants compatible with the appearance thereof.

While the specific gravity of the mulch chips should be above 1, the chips may be formed to include a cellular structure so long as they do not thereby become buoyant in water. The cellular structure may be either of the open or closed-cell type and may be provided, for example, through the incorporation of chemical blowing agents in the chips, particularly those activated by heat at the temperature at which the chips are molded, or it may be achieved by introduction of an inert gas into the chips during their fabrication, both techniques being well known in the art. Alternatively, the mulch chips may be formed from foamed plastics comprising all or part of recycled plastics from which the chips are made. The fabrication of foamed chips provides the advantage of requiring less plastic materials for a given chip volume, and in those instances where fugitive materials are incorporated in the chips for dissemination to their surroundings, additional active surface area is thereby made available.

The chips may be irregular or uniform in shape, and their dimensions may vary within relatively wide limits. Typically, however, the chips will range from about 1½ to about 3 inches at their widest point, and will be about ⅛th to ⅜ths inch thick.

Figure 2:
FIG. 2 is a cross-sectional view of the mulch chip of the invention along line 2—2 of FIG. 1.

FIG. 1 is an isometric view of a mulch chip of the invention simulating a natural bark chip. FIG. 2 is a cross-section of the chip of FIG. 1 along the line 2—2 of the latter. As previously indicated, embossing not only provides the chip with a pleasing appearance, but has the unobvious advantage of providing a chip having a greater exposed surface area, and therefore, one able to disperse active repellents, insecticides or odorants more effectively than would otherwise be possible.

The chips of the invention may be fabricated from any of a variety of plastics, including without limitation such materials as ABS, acetal resin, acrylics, cellulose acetate, fluorinated plastics, ionomer resin, polyamides, polybutene, polycarbonate, polyethylene, poly(ethylene terephthalate), polypropylene, polysulfone, polystyrene, poly(vinyl chloride), poly(vinylidene chloride), and others.

The mulch chips of the invention may be prepared by any of various processes including injection molding, low pressure molding, or by other means.

While in accordance with the patent statutes, a preferred embodiment and best mode has been presented, the scope of the invention is not limited thereto, but rather is measured by the scope of the attached claims.

What is claimed is:

1. A mulch chip prepared from a composition comprising synthetic polymeric plastic, said composition having a specific gravity greater than 1, and an exterior surface of said chip having a design embossed thereon which simulates the bark of a tree.

2. A mulch chip according to claim 1 in which said plastic is a thermoplastic polymer, and said composition also includes at least one member selected from the group consisting of an odorant, and an insecticide.

3. A mulch chip according to claim 1 which also includes at least one member selected from a UV absorber, and a colorant.

4. A mulch chip according to claim 1 being from about 1½ inches to about 3 inches at its widest point, and from about ⅛ inch to about ⅜ inch thick.

5. A mulch chip prepared from a composition comprising at least one thermoplastic polymer, said composition having a specific gravity greater than 1, and an exterior surface of said chip being configured to simulate the bark of a tree.

6. A mulch chip according to claim 5 which also includes at least one member selected from a member of the group consisting of an odorant, and an insecticide.

7. A mulch chip according to claim 5 which also includes at least one member selected from a UV absorbent, and a colorant.

* * * * *